July 15, 1969  J. L. TURNBLOM ET AL  3,455,353
AUTOMATIC ROUTING MACHINE FOR CUTTING A CIRCULAR
GROOVE IN A SPOOL HEAD
Filed June 16, 1967  2 Sheets-Sheet 1
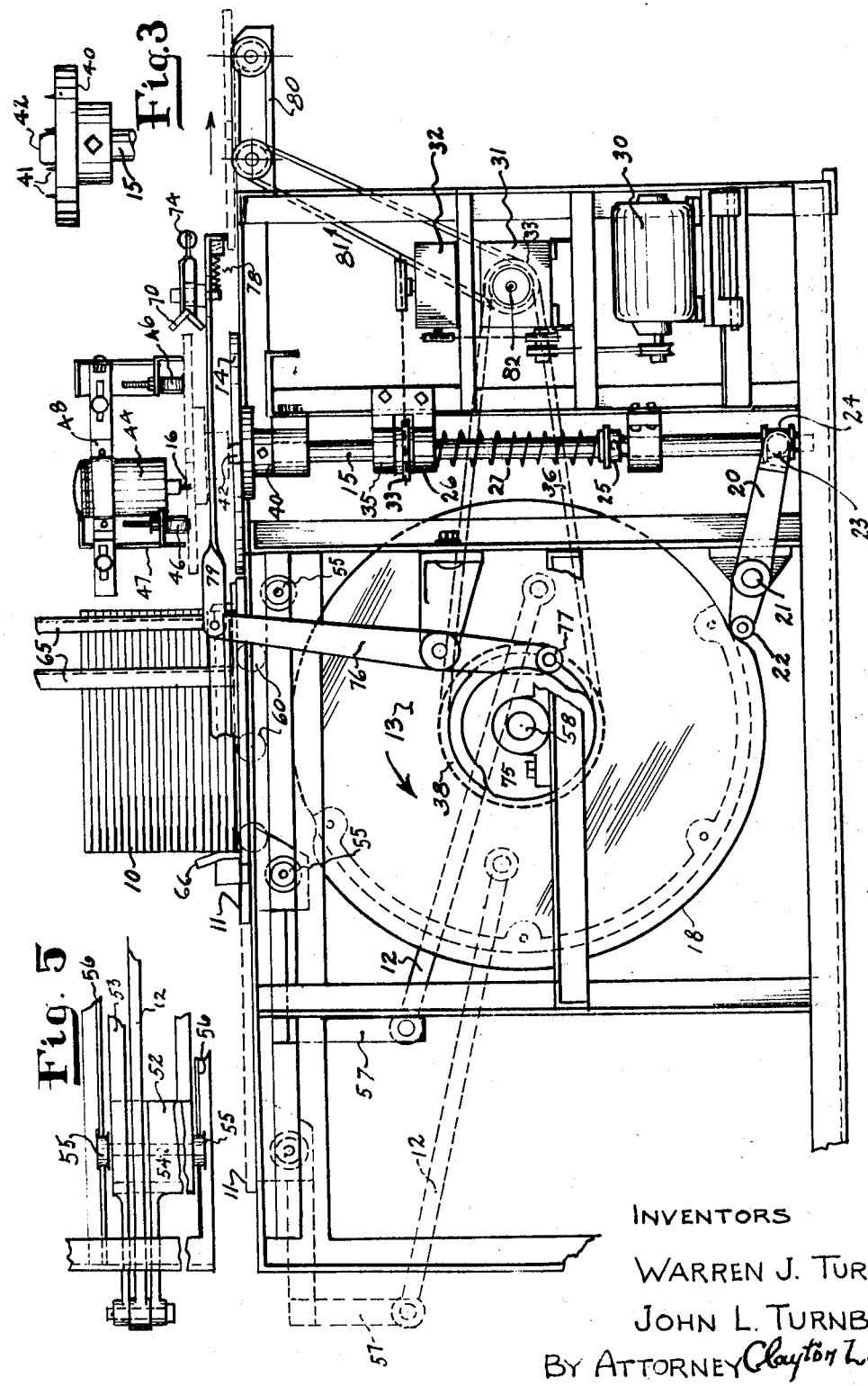
INVENTORS
WARREN J. TURNBLOM
JOHN L. TURNBLOM
BY ATTORNEY Clayton L. Jenks

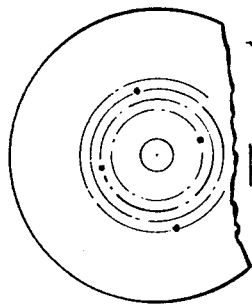
Fig. 4
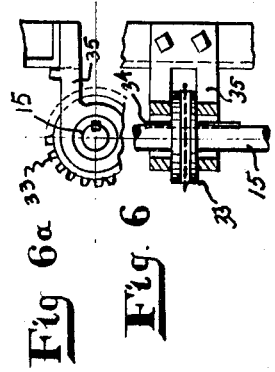
Fig. 6a
Fig. 6
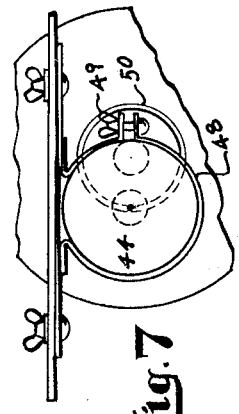
Fig. 7
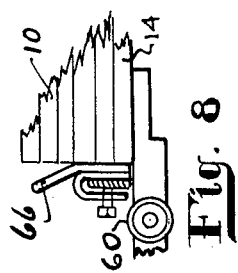
Fig. 8
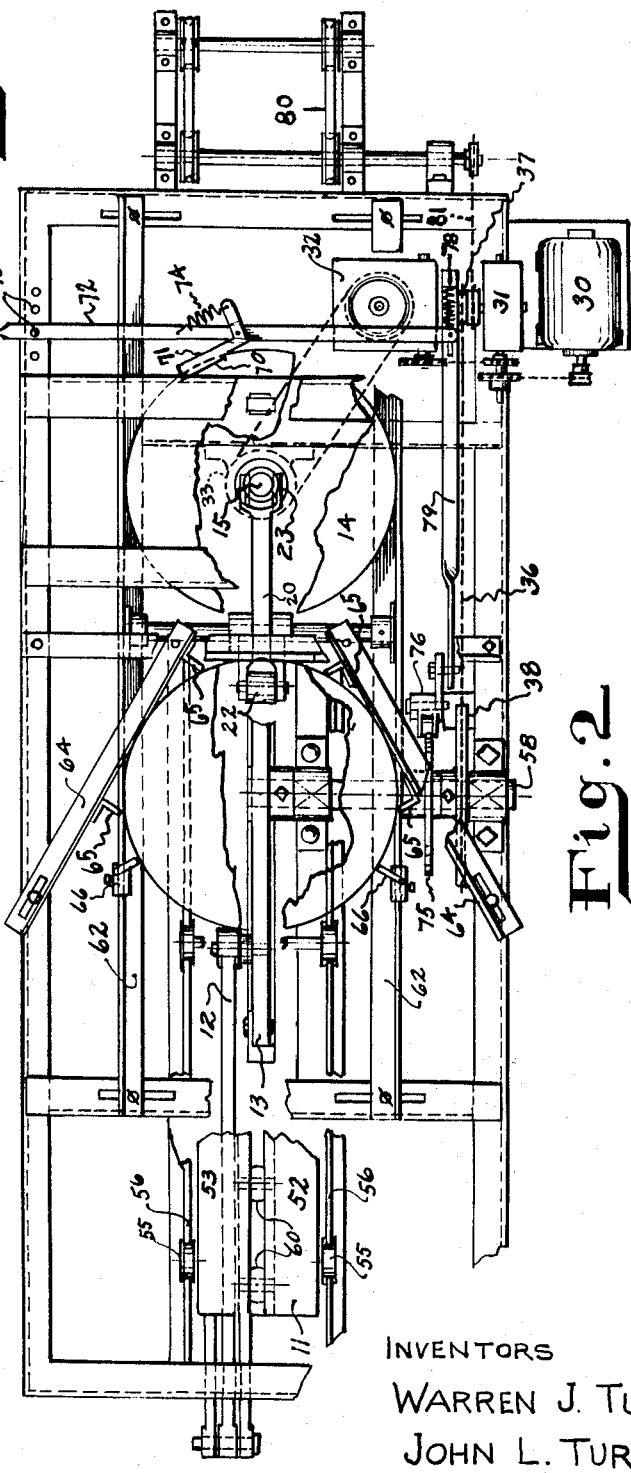
Fig. 2
INVENTORS
WARREN J. TURNBLOM
JOHN L. TURNBLOM
BY ATTORNEY *Clayton L. Jenks*

United States Patent Office
3,455,353
Patented July 15, 1969

3,455,353
AUTOMATIC ROUTING MACHINE FOR CUTTING A CIRCULAR GROOVE IN A SPOOL HEAD
John L. Turnblom, 100 Greenwood St., Worcester, Mass. 01607, and Warren J. Turnblom, 152 Pakachoag, St., Auburn, Mass. 01501
Filed June 16, 1967, Ser. No. 646,519
Int. Cl. B27m *3/30;* B27c *5/00*
U.S. Cl. 144—14    8 Claims

ABSTRACT OF THE DISCLOSURE

An automatic routing machine having an immovable wood routing tool, pusher mechanism to feed wooden disc shaped spool heads serially and laterally to a position adjacent to the tool, power mechanism to rotate the spool head eccentrically relative to the tool, cam operated mechanism to move the head axially into a cutting contact with the tool to cut a circular groove therein, and a rasp on a cam operated lever which serves to smooth the edge of the head, each head when moved into a routing position serving to discharge the finished piece.

---

This invention relates to an automatic routing machine for forming a circular groove in the wooden head of a spool used, for example, for holding long lengths of wire. Such a spool usually comprises a hollow cylindrical body on which the wire is wound and two wooden disc shaped heads having circular grooves into which the edges of the body are interfitted and secured. Heretofore, this operation of forming the groove in the head has been a laborious one done manually with a considerable waste of time and effort.

The primary object of this invention is to provide a mechanism which works automatically for progressively and serially feeding a set of the spool heads to a routing tool which forms a circular groove therein.

A further object is to provide a mechanism which withdraws the heads one at a time from a set in a parallel or juxtaposed arrangement and moves the same laterally to a position where it is further moved axially into contact with the routing tool, these operations being carried on in a timed relationship.

A further object of the invention is to provide a mechanism for automatically smoothing the edge of each wooden head as it is being rotated so as to eliminate ragged conditions that might cause injury to a person using the spool. Other objects will be apparent in the following disclosure.

This invention preferably comprises means for holding a supply of the wooden spool heads juxtaposed in a parallel arrangement and an automatically operated pusher which serves to remove the end one of the heads and thrust it laterally to a position adjacent to a routing tool where it is rotated by a spindle and automatically moved into contact with the tool to cause the formation of a circular groove, after which it is moved from its operative position and another head is thrust laterally against a previously finished piece to remove the latter from the work zone.

Referring now to the drawings which illustrate the preferred embodiment of the invention:

FIG. 1 is a fragmentary somewhat diagrammatic side view of the machine;

FIG. 2 is a top plan view of the machine, partly broken away for clarity of illustration;

FIG. 3 is a fragmentary detail of the driving head of the work spindle;

FIG. 4 is a fragmentary plan view of the top of the driving head which shows the locations and rotational paths of the driving pins;

FIG. 5 is a fragmentary top plan view of the pusher;

FIGS. 6 and 6a are details of the driving gear slidably connected with the work rotating shaft;

FIG. 7 is a fragmentary detail showing the adjustable mount for the routing tool; and FIG. 8 is a fragmentary detail of the pusher and a limit guide for a stack of spool heads.

In the preferred construction the spool heads are stacked in a parallel arrangement and the pusher serves to move the stack laterally and present the bottom head of the stack laterally and present it to a driver on a vertical axially movable rotating shaft which lifts the head into routing contact with the tool. The spindle is axially moved by a cam, and the pusher which removes the bottom spool head from the stack may also be operated by a pitman driven by the same cam which serves to elevate the arbor. Likewise, a rasp is employed to smooth the edge of the rotating head and this is preferably brought into contact with the head by means of a second cam which moves it forward just after the work has been elevated to its operating position and which removes it just prior to the discharge of the finished workpiece.

As illustrated we mount a plurality of spool heads 10 in a close parallel arrangement and progressively remove the end spool head of the group and transport it laterally to a position where a routing tool cuts a circular groove therein. In the arrangement illustrated, the spool heads are horizontal and stacked vertically, and the bottom one of the stack is serially removed by a reciprocating pusher 11. The pusher is reciprocated by a pitman 12 driven by a stud on the side of a rotary cam wheel 13. Each spool head as it is removed from the bottom of the stack is transported to a right hand position indicated by the numeral 14 (FIG. 1) where it is elevated by a cam reciprocated rotating shaft 15 to a position of contact with a routing tool 16 arranged eccentric with the shaft.

The shaft 15 is vertically reciprocated periodically by means of a cam on the outer periphery of the cam wheel 13. This cam may comprise a separate removable arcuate member 18, as indicated in dotted lines in FIG. 1, which is suitably bolted to the cam wheel 13 and arranged for replacement as needed. The cam 13 has two cylindrical surfaces, one a high surface formed by the part 18 and the other a low surface so arranged that the shaft 15 may be held in either a high or a low position as required. This shaft movement is accomplished by means of a lever 20 of the first class suitably mounted on a fixed pivot 21 on a portion of the machine frame. A roller 22 suitably mounted on the short end of that lever follows the periphery of the cam 13. The other end of the lever is forked and has lugs 23 which ride between the flanges of a spool 24 fixed on the shaft 15 and so arranged that as the cam 13 rotates, the lever 20 will elevate the shaft 15. A compression spring 27 engaging at its lower end a collar 25 fixed on the shaft has its upper end bearing against a fixed sleeve 26 forming a part of the member 35 on the frame work of the machine, so that the shaft 15 is held normally in a lowermost position except when elevated by the cam. The high portion 18 of the cam forms about one half of the cam periphery and the cam riser is so positioned as to lift the spool head 14 just after it has been fed into position beneath the routing tool.

The shaft 15 and the cam 13 are rotated constantly by a standard electric motor 30 of suitable characteristics which is belt connected thereto through a pair of suitable belt driven reduction gear systems 31 and 32, which are separately driven, as shown, by belt connections from the motor 30. The system 31 is connected to drive the cam 13. The system 32 drives the shaft 15 by means of a sprocket 33 slidably keyed on the shaft 15 as is best illustrated in FIGS. 6 and 6a. As there shown, the key 34 has clearance for revolving within the bifurcated support 35 which slidably engages the sides of the gear 33 and retains the gear in position as the shaft slides therethrough.

The cam wheel 13 preferably is rotated at a comparatively low speed, such as 7 or 8 revolutions per minute, as may be accomplished by having the first reduction gear system 31 and its associated pulley connections with the cam wheel 13 so arranged as to give about a 60 to 1 speed ratio take off from the motor 30. The cam 13 is rotated by a driving chain 36 and suitable sprockets 37 and 38 as shown. The spool head 14 may be driven at a rotational speed of about 2½ times for each rotation of the cam wheel 13, as may be accomplished by the separate reduction system 32 driven directly by motor 30, which gives a suitable reduction radio, such as 10 to 1.

In order to rotate the spool head positively, the vertical recpirocable shaft 15 is provided with a driving head 40 which, as shown in FIGS. 3 and 4, has a series of eccentrically located spikes 41 projecting sufficiently to penetrate the under surface of the spool head 14 and start it into rotation. The eccentricity insures that each spike drived independently of the others. The head as presented to the machine has previously been provided with a center hole and the top end 42 of the shaft 15 is shown in FIG. 3 as having entered that hole to center the head on the shaft for the routing operation. This step is accomplished when the cam roller 22 starts up the high surface of the cam 18. Thus, the spool head is being positively rotated at the moment when it is elevated into routing contact with the tool 16.

That tool may be of suitable construction, but it is preferably a wood drill rotated at a comparatively high speed by a suitable power driven electric motor 44. Two or more caster-like rollers 46 (FIG. 1) are adjustably mounted on depending parts of the frame work 47 and serve to steady the spool head against the drill pressure. As shown in FIG. 7, the motor 44 may be adjustably mounted by means of clamping bands 48 suitably carried by a portion of the frame work and so arranged as to be adjusted and held by means of wing nuts 49 so that the motor 44 may be mounted in any desired elevated position and predetermine exactly the depth of the routing cut 50 (FIG. 3) such as ¼ inch.

Various forms of pusher mechanism may be employed for removing the end spool head, such as the bottom member 14 of the stack 10. The pusher, as illustrated in FIGS. 1 and 5, comprises two spaced frame members 52 and 53 which have axles 54 carrying spool shaped rollers 55 riding on vertical rails or flanges 56 of the frame which locate and guide the pusher carriage in its travel. The frame may comprise angle irons and other shapes suitably welded together. The pitman rod 12 is connected to a depending arm 57 on the carriage, and the parts are so arranged that rotation of the cam wheel 13 reciprocates the pusher to the required extent. The cam 13 is mounted on a short shaft 58 (FIG. 2) suitably supported on the frame work on one side only of the cam, so that the pitman 12 may move freely.

The pusher carriage has two or more rollers 60 so mounted between the two halves of the bifurcated structure as to project just slightly above the top horizontal surface of the carriage and be in position to receive the weight of the stack 10 while the carriage is withdrawn toward the left. The stack ultimately rests on the adjustably positioned parts 62 of the frame when the pusher is fully withdrawn, as shown in FIG. 2.

In order to accommodate various sizes of spool heads, two horizontal angle irons 64 are adjusted at an angle, as shown in FIG. 2, and each of these irons carries two vertical angle iron posts 65 arranged on the forward feeding side of the work pieces or spool heads. As shown in FIG. 8, a short adjustably positioned upright piece 66 may be arranged at the left hand side of the stack 10 so as to hold the stack in position when the pusher moves to the left and thus to locate the bottom spool head properly for reception by the reciprocating pusher when the latter again moves to the right.

Since the edges of the spool head may be rough, we have provided a rasp 70 so mounted and moved that it will smooth the edges during the routing operation. To this end, the rasp preferably has a concave angular shape and is mounted on one arm of an L-shaped lever 71 which is pivoted on the side of a long swinging arm 72 (FIG. 2). The arm 72 is in turn pivoted at its top on a pin adjustably positioned in one of several holes 73 in the frame work, as indicated so as to accommodate different sizes of spool heads 14. A tension spring 74 attached to the L-shaped lever and the long arm 72 provides for a limited movement of the rasp towards the spool head. A full contact of the rasp with the spool head periphery is accomplished by means of a cam 75 (FIG. 1) fixed on the shaft 58 of the cam wheel 13. A rocking lever 76 of the first class, pivotally mounted on the frame work, carries a cam roller 77 held against the periphery of the cam 75 by means of a compression spring 78 between a lug on the horizontal connector arm 79 and a fixed piece of the frame.

It will be noted that the cam 75 has a high cylindrical surface concentric with the cylindrical surface 18 but slightly shorter radially so that the rasp will engage the spool head only after the head has been elevated into a routing contact with the drill 16 and will break contact with the spool head before the latter is to be discharged by an incoming piece. It will now be appreciated that the various parts of the mechanism may be adjusted to accommodate different diameters and thicknesses of spool heads. The pusher carriage may be reciprocated through a maximum extent for each spool head diameter or the stroke of the pitman 12 may be suitably adjusted.

In the operation of the machine, the pusher carriage is reciprocated once per cam rotation to remove only the bottom one of the stack of spool heads and move it laterally to a position where its previously formed center hole is aligned with the vertically reciprocable shaft 15. Then when the cam roller 22 rises onto the high surface portion 18 of the cam 13, the spool head is moved upwardly into routing contact with the constantly rotating drill spindle 16. This spool head is preferably rotated at least two full rotations for each routing operation so as to make sure that the groove is fully formed and that the rasping operation is satisfactory. Preferably during the time while the groove is being formed, the rasp 70 is moved by its cam 75 and follower 77 into contact with the work periphery just after the work has been elevated for the routing step and it is removed just before the spool head is lowered. Thereafter, when the cam roller 22 rides onto the lower surface of the big cam 13 the spool head is lowered by the spring 27 to the position shown in FIG. 1, so that when a new work piece is later thrust into place, the finished head will be pushed out of the work zone and preferably onto the surface of a power driven endless belt 80. The latter may be driven by a belt connection 81 with the driving spindle 82 (FIG. 1) of the reduction system 31 which rotates the cam 13. This removes the finished work from the operating zone.

It will now be appreciated that various modifications may be made in this construction within the scope of our invention and especially as may be desired for feeding a plurality of spool heads serially and progressively for cutting a circular axially concentric groove therein.

We claim:

1. An automatic routing machine for cutting a circular groove in a wooden spool head comprising means for holding a plurality of said heads in parallel juxtaposition, a rotatable shaft carrying a driver at one end, means for rotating the shaft, a pusher mechanism to feed the end heads serially and laterally into position to be engaged by said driver for rotation thereby, a routing tool mounted eccentric to the shaft and spaced from said driver, and cam controlled mechanism for periodically moving the driver and tool relatively to thrust the spool head on the driver into a groove cutting contact with the tool.

2. A machine according to claim 1 in which said shaft is vertical and the driver is mounted on the upper end thereof, and wherein the spool heads are arranged horizontally in a vertical stack, and said pusher removes the bottom head of the stack and transports it to a position above said driver for engagement thereby.

3. A machine according to claim 2 in which said shaft is vertically reciprocable and comprising a driven cam wheel having high and low cam portions on its periphery, a cam follower engaging said periphery and connections between said cam follower and shaft which serve to lift the shaft and thrust the spool head on the driver into a routing contact with the tool, said cam being timed to lift the shaft after a spool head has been positioned relative to the driver.

4. A machine according to claim 2 in which the pusher has depending rollers riding on rails on the machine and a further set of rollers projecting slightly above its top surface which support the stack during return movement of the pusher.

5. A machine according to claim 3 comprising a pitman connection between the cam wheel and the pusher which reciprocates the pusher in a timed relation with the cam follower movement of the shaft.

6. A machine according to claim 3 in which rollers adjacent to the spool head support it against the pressure of the routing tool.

7. A machine according to claim 3 comprising a rasp movably mounted for smoothing the spool head periphery, a second cam acting in a timed relation with the shaft moving cam, a cam follower for said second cam and connections between the follower and the rasp to move the latter to engage the spool head, said cams being timed to cause the rasp action while the routing is being accomplished.

8. A machine according to claim 7 in which the router is an electrically driven drill and wherein adjustable retaining means are provided to hold stacks of different sized spool heads, said drill and the rasp being adjustably positioned according to the spool head size.

References Cited

UNITED STATES PATENTS

| | | | |
|---|---|---|---|
| 12,884 | 5/1855 | Barber | 144—139 |
| 38,461 | 5/1863 | Brandon | 144—139 |
| 219,813 | 9/1879 | Haley | 144—154 X |
| 406,219 | 7/1889 | Jorres | 144—139 |
| 595,463 | 12/1897 | Belden | 144—150 |

DONALD R. SCHRAN, Primary Examiner

U.S. Cl. X.R.

90—20; 144—136, 139